United States Patent
Zhang et al.

(10) Patent No.: US 10,002,196 B2
(45) Date of Patent: Jun. 19, 2018

(54) SYSTEMS AND METHODS FOR PARAGRAPH-BASED DOCUMENT SEARCHING

(71) Applicant: LexisNexis, a division of Reed Elsevier Inc., Miamisburg, OH (US)

(72) Inventors: Paul Zhang, Centerville, OH (US); David Steiner, Waynesville, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 148 days.

(21) Appl. No.: 14/748,918

(22) Filed: Jun. 24, 2015

(65) Prior Publication Data

US 2015/0294017 A1    Oct. 15, 2015

Related U.S. Application Data

(63) Continuation of application No. 13/077,223, filed on Mar. 31, 2011, now Pat. No. 9,098,570.

(51) Int. Cl.
G06F 7/00       (2006.01)
G06F 17/30      (2006.01)

(52) U.S. Cl.
CPC .... *G06F 17/30867* (2013.01); *G06F 17/3053* (2013.01); *G06F 17/30663* (2013.01); *G06F 17/30675* (2013.01)

(58) Field of Classification Search
CPC ................................................ G06F 17/3053
See application file for complete search history.

(56) References Cited

U.S. PATENT DOCUMENTS

| | | | |
|---|---|---|---|
| 5,293,552 | A | 3/1994 | Aalbersberg |
| 5,943,669 | A | 8/1999 | Numata |
| 6,772,149 | B1 | 8/2004 | Morelock et al. |
| 7,283,997 | B1 | 10/2007 | Howard et al. |
| 7,756,855 | B2 | 7/2010 | Ismalon |
| 7,840,524 | B2 | 11/2010 | Egger et al. |
| 2002/0082778 | A1 | 6/2002 | Barnett et al. |
| 2003/0225756 | A1 | 12/2003 | Liu |
| 2006/0155690 | A1 | 7/2006 | Wen et al. |
| 2008/0208837 | A1 | 8/2008 | Wang |

(Continued)

OTHER PUBLICATIONS

International Bureau, PCT Notification Concerning Transmittal of International Preliminary Report on Patentability (Chapter 1 of the Patent Cooperation Treaty), International Application No. PCT/US2012/030235, dated Apr. 3, 2014, The International Bureau of WIPO, 34, chem des Colombettes, 1211 Geneva 20, Switzerland.

(Continued)

*Primary Examiner* — Ajith Jacob
(74) *Attorney, Agent, or Firm* — Dinsmore & Shohl LLP

(57) ABSTRACT

A computerized method of searching a collection of electronic documents may include comparing search terms to sets of paragraph terms associated with paragraphs in the documents. Search terms and paragraph terms may be standardized, prior to the comparison. The method may also include generating paragraph scores for the paragraphs using term weight values associated with paragraph terms that match search terms, generating paragraph scores for the paragraphs, and using the paragraph scores to generate overall document scores. The method may also include using the overall document scores to determine a set of search results and providing the search results to a display.

15 Claims, 4 Drawing Sheets

(56) References Cited

U.S. PATENT DOCUMENTS

| | | |
|---|---|---|
| 2008/0235148 A1 | 9/2008 | Liu |
| 2008/0263023 A1 | 10/2008 | Vailaya et al. |
| 2008/0263033 A1 | 10/2008 | Vailaya et al. |
| 2009/0248675 A1 | 10/2009 | Kawabata et al. |
| 2010/0131569 A1 | 5/2010 | Jamison et al. |
| 2011/0145229 A1 | 6/2011 | Vailaya et al. |

OTHER PUBLICATIONS

PCT International Search Report dated Jun. 20, 2012, regarding International Application No. PCT/US12/30235; original International filing date Mar. 23, 2012.

Suliman Al-Hawamdeh and Peter Willett, "Paragraph-based nearest neighbour searching in full-text documents", Electronic Publishing, vol. 2(4), 179-192 (Dec. 1989), Department of Information Studies, University of Sheffield, Western Bank, Sheffield, S10 2TN, UK.

Fred Leise, Karl Fast, Mike Steckel, on Dec. 16, 2002, "What is a Controlled Vocabulary?", Boxes and Arrows: The Design Behind the Design, January Issue, 2011, http://www.boxesandarrows.com/view/what_is_a_controlled_vocabulary_.

Fred Leise, Karl Fast, Mike Steckel, on Aug. 26, 2003, "Synonym Rings and Authority Files", Boxes and Arrows: The Design Behind the Design, January Issue, 2011, http://www.boxesandarrows.com/view/synonym_rings_and_authority_files.

Xiao-Ling Wang, Ji-Rong Wen, Jin-Feng Luan, Wei-Ying Ma, Yi-Sheng Dong, "A Method to Query Document Database by Content and Structure", Journal of Software, 2003, 14(5):976-983, Department of Computer Science and Engineering, Southwest University, Nanjing 210096, China, http://www.jos.org.cn/1000-9825/14/976.htm.

Canadian Patent Application No. 2,832,001, Examiner's Report, dated Feb. 26, 2016.

"Synonym ring", Wikipedia entry, Jun. 6, 2010, retrieved on Mar. 23, 2016 from Internet Archive: http://web.archive.org/web/20100606053820/http://en.wikipedia.org/wiki/Synonym_ring.

SYSTEMS AND METHODS FOR PARAGRAPH-BASED DOCUMENT SEARCHING

CROSS-REFERENCE TO RELATED APPLICATIONS

This application is a continuation of U.S. patent application Ser. No. 13/077,223 entitled "Systems and Methods for Paragraph-Based Document Searching," filed on Mar. 31, 2011.

TECHNICAL FIELD

Embodiments provided herein generally relate to document searching and, more particularly, to systems and methods for searching a collection of electronic documents using generated paragraph scores for paragraphs within the documents.

BACKGROUND

As electronic systems convert documents and other data into electronic form, many of the documents that have been converted are indexed to facilitate search, retrieval, and/or other functions. For example, legal documents, such as court decisions, briefs, motions, etc., may be stored and indexed for users to access electronically. As different legal documents may include different legal points pertaining to different jurisdictions, those documents may be indexed and organized accordingly. However, problems can arise when using conventional techniques to index and search legal documents. In conventional search engines, search terms are first matched to terms appearing in the body of a document. Documents are then ranked based on the distance between the matched words in the document. However, this approach may be problematic in the context of legal documents and other types of documents that typically contain related, but distinct, sub-topics. Search terms may appear in multiple sections of these types of documents, thereby increasing the document's rank, even though many of the sub-topics within the document are not directly on-point for the user's query. This is particularly problematic when the search query is long or contains non-central terms. A user of such a conventional search system must spend additional time and resources to determine which of the documents in the search results are actually of interest. Due to this failure to distinguish between documents that contain sections that are relevant to the search request and those that contain only tangentially-related sections, such electronic search systems may fail to retrieve many of the relevant documents, thus rendering the electronic search system less effective for its intended purpose.

Accordingly, alternative systems and methods for searching a collection of documents and document retrieval are desired.

SUMMARY

In one embodiment, a method of searching a collection of electronic documents includes generating a set of paragraph terms associated with an individual paragraph for paragraphs of electronic documents in the collection. The method also includes associating term weight values with paragraph terms in the sets of paragraph terms, where each term weight value may be associated with an individual paragraph term. The method further includes generating a set of search terms based at least in part on a query string of the search query, in response to receipt of a search query, and comparing the set of search terms with the sets of paragraph terms, and generating a paragraph score for the paragraphs using the term weight values of the paragraph terms that match one or more of the search terms. Each paragraph score may be associated with an individual paragraph. The method yet further includes generating an overall document score associated with an individual electronic document for the electronic documents by combining the paragraph scores of the paragraphs in the electronic documents. A set of matching documents may be determined by a processor in part on the generated overall document scores. The set of matching documents may be sorted by overall document score. The method may additionally include providing the set of matching documents for display.

In another embodiment, a method of searching for electronic documents includes storing, in a memory, standardized paragraph terms for paragraphs of electronic documents associated with a collection of electronic documents. Each standardized paragraph term may have an associated term weight. The method further includes generating standardized search terms in response to receipt of a search query and applying paragraph scores to the paragraphs based at least in part on the associated term weights of the standardized paragraph terms that match one or more of the standardized search terms. Each paragraph score may be associated with an individual paragraph. The method also includes determining overall document scores for the electronic documents based at least on part on a combination of the paragraph scores associated with individual electronic documents. A set of matching documents may be determined by a processor from the electronic documents associated with the collection based at least in part on the generated overall document scores. The electronic documents within the set of matching documents may be sorted by overall document score. The method may additionally include providing the set of matching documents for display.

In yet another embodiment, a document retrieval system includes a computing device that includes a non-transitory memory that stores standardized paragraph terms for paragraphs of a collection of electronic documents. Each standardized paragraph term may have an associated term weight. The memory also stores executable instructions that cause the computing device to generate standardized search terms in response to a search query and to further cause the computing device to generate a paragraph scores for the paragraphs based at least in part on the associated weights of standardized paragraph terms that match one or more of the standardized search terms. The instructions additionally cause the computing device to determine overall document scores for the electronic documents based at least in part on a combination of the paragraph scores. The instructions further cause the computing device to determine a set of matching documents that may be ordered using the document scores of the matching documents.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to systems and methods for performing a paragraph-based search of a collection of electronic documents. Embodiments utilize data-mining techniques to extract paragraph terms from paragraphs contained within the documents. In some embodiments, paragraph terms are standardized to replace synonymous terms with a predefined set of terms. Term weight values are associated with the paragraph terms and stored for each paragraph. End users, software applications/programs, and back-end processes may utilize search queries to search for specific topics or words. The search queries are then parsed by a computing device for search terms. Where term standardization is used for the paragraph terms, the search terms may also be standardized. Search terms are matched to paragraph terms and the term weight values associated with the matching paragraph terms are used to generate paragraph scores. Overall document scores are determined using the paragraph scores to determine a set of matching documents. The set of matching documents may then be provided to the requesting application, back-end processes, or user via an electronic display or other interactive device.

Although the embodiments are described herein in the context of a collection of electronic legal documents, it should be understood that the embodiments are not limited thereto. For example, the methods described herein may be utilized to search any form of electronic document that contain disparate, but related, topics in different sections of the document (e.g., medical texts, scientific publications, etc.).

Figure 1:
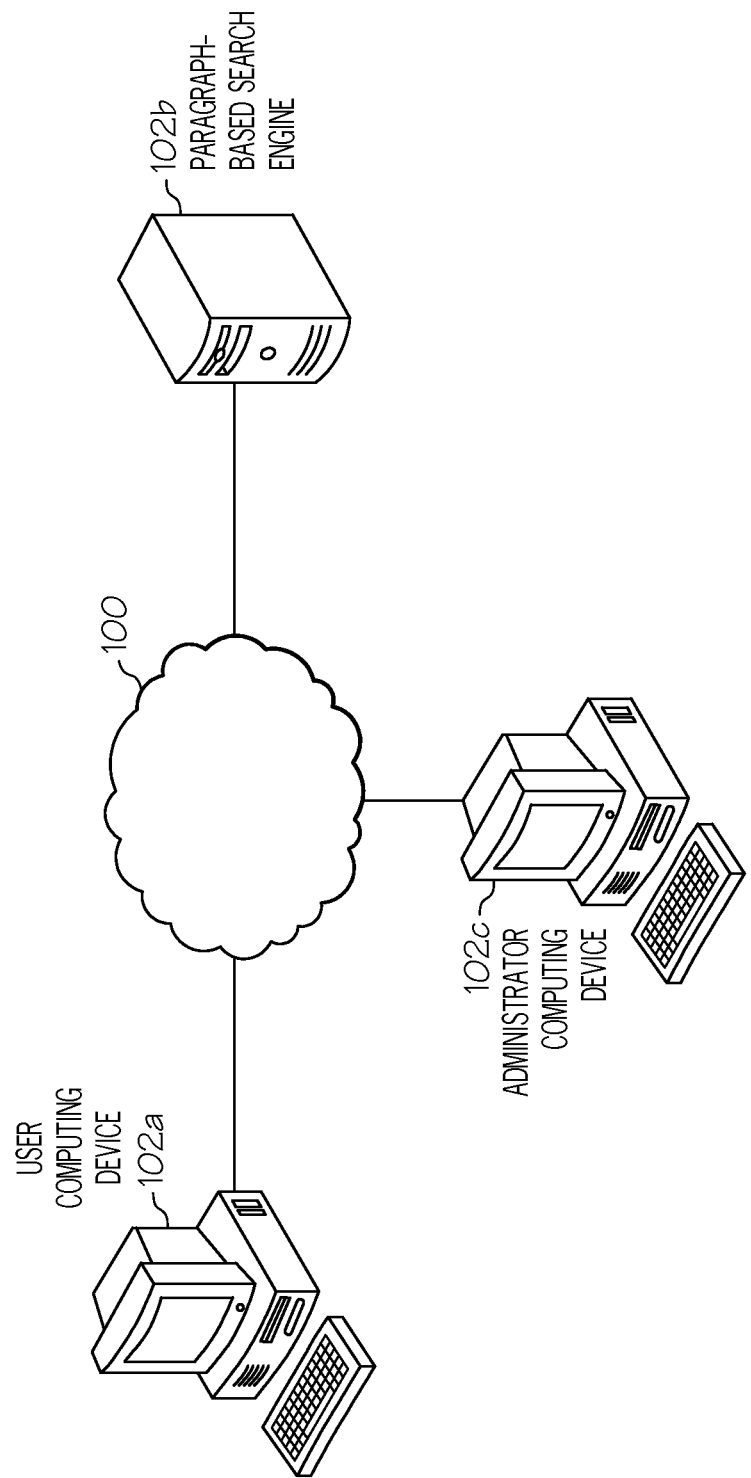
FIG. 1 depicts a schematic illustration of a system for paragraph-based searching, according to one or more embodiments shown and described herein.

Referring now to the drawings, FIG. 1 depicts an exemplary computing network, illustrating components for a system for paragraph-based searching, according to embodiments shown and described herein. As illustrated in FIG. 1, a computer network 100 may include a wide area network, such as the Internet, a local area network (LAN), a wide area network (WAN), a mobile communications network, a public service telephone network (PSTN) and/or other types of networks and may be configured to electronically connect a user computing device 102a, a paragraph-based search engine 102b, and an administrator computing device 102c.

The user computing device 102a may be used to input one or more documents into a collection of electronic documents. The user computing device 102a may also initiate an electronic search for one or more documents in a collection. More specifically, to perform an electronic search, the user computing device 102a may send a request (such as a hypertext transfer protocol (HTTP) request) to another computing device, such as the paragraph-based search engine 102b, to provide data for presenting an electronic search capability that includes providing a user interface to the user computing device 102a. The user interface may be configured to receive a search request from the user and to initiate the search. The search request may include terms and/or other data for retrieving a document. The paragraph-based search engine 102b, may search for documents related to the search terms and provide data for another user interface that allows for operations that may be utilized for the paragraph-based search.

As described herein, the paragraph-based search engine 102b may be configured to search for desired electronic documents by comparing search terms to paragraph terms that have associated term weight values, generating paragraph scores for the paragraphs using the term weight values, generating an overall document score for the documents, determining a set of matching documents based on their document scores, and providing the set of matching documents for display.

The computing network 100 may also include the administrator computing device 102c. In the event that the paragraph-based search engine 102b requires oversight, updating, or correction, the administrator computing device 102c may be configured to provide the desired oversight, updating, and/or correction. Administrator computing device 102c may also be used to input and/or store electronic documents. It should also be understood that some embodiments may not utilize an administrator computing device 102c.

It should also be understood that while the user computing device 102a and the administrator computing device 102c are depicted as personal computers and the paragraph-based search engine 102b is depicted as a server, these are merely examples. More specifically, in some embodiments any type of computing device (e.g. mobile computing device, personal computer, server, etc.) may be utilized for any of these components. Additionally, while each of these computing devices is illustrated in FIG. 1 as a single piece of hardware, this is also an example. More specifically, each of the user computing device 102a, paragraph-based search engine 102b, and administrator computing device 102c may represent a plurality of computers, servers, databases, etc., or any other form of electronic device.

Figure 2:
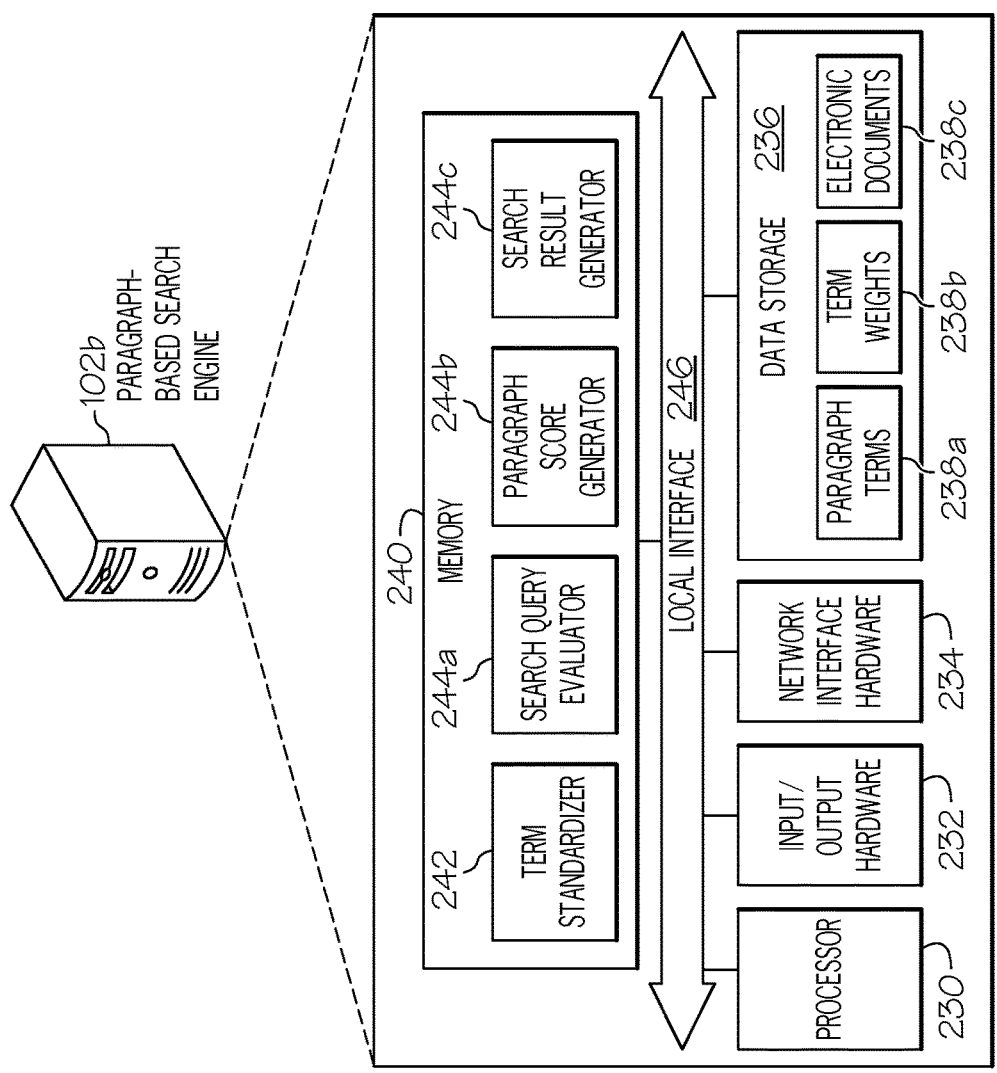
FIG. 2 depicts a schematic illustration of the hardware and software components of the paragraph-based search engine illustrated in FIG. 1, according to one or more embodiments show and described herein.

FIG. 2 schematically depicts the paragraph-based search engine 102b, further illustrating a system for performing a paragraph-based search and/or a non-transitory computer-readable medium for performing a paragraph-based search embodied as hardware, software, and/or firmware, according to embodiments shown and described herein. While in some embodiments, the paragraph-based search engine 102b may be configured as a general purpose computer with the requisite hardware, software, and/or firmware, in some embodiments, the paragraph-based search engine 102b may be configured as a special purpose computer designed specifically for performing the functionality described herein.

The paragraph-based search engine 102b may include a processor 230, input/output hardware 232, network interface hardware 234, a data storage component 236 (which stores paragraph terms 238a, term weights 238b, and electronic documents 238c), and a memory 240. The memory 240 may be configured as volatile and/or nonvolatile memory and, as such, may include random access memory (e.g., SRAM, DRAM, and/or other types of random access memory), flash memory, registers, compact discs (CDs), digital versatile discs (DVDs), and/or other types of non-transitory storage components. Additionally, the memory 240 may be configured to store term standardizer 242, search query evaluator 244a, paragraph score generator 244b, and search result generator 244c (each of which may be embodied as a computer program, firmware, or hardware, as an example). A local interface 246 is also included in FIG. 2 and may be implemented as a bus or other interface to facilitate communication among the components of the paragraph-based search engine 102b.

The processor 230 may include any processing component configured to receive and execute instructions (such as from the data storage component 236 and/or memory 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the paragraph-based search engine 102b and may be configured to store one or more pieces of data for access by the paragraph-based search engine 102b and/or other components. It should also be understood that while paragraph terms 238a, term weights 238b, and electronic documents 238c are illustrated as being stored as part of data storage component 236, they may be physically stored in the data storage component of multiple data storage components.

The data storage component 236 stores electronic documents 238c, which in at least one embodiment, includes legal and/or other documents that have been organized and indexed for searching. The legal documents may include case decisions, briefs, forms, treatises, academic journals, or other types of law-related documents. In some embodiments, the documents may also be associated with one or more collections of documents (e.g., all U.S. Supreme Court cases, all journal articles from The Ohio State University, all articles related to patent law, etc.). Similarly, paragraph terms 238b may be stored by the data storage component 236 and contain sets of paragraph terms found within electronic documents 238c. In some embodiments, paragraph terms 238a may be paragraph terms that have been standardized by term standardizer 242. Data storage 236 may also store term weights 238b that are associated with paragraph terms 238a.

The term standardizer 242, search query evaluator 244a, paragraph score generator 244b, and search result generator 244c, may be stored in the memory 240 or in other storage locations (e.g., on a computer-readable medium, in the memory of a remote computer, as part of a cloud computing environment, etc.). As described in more detail later, search query evaluator 244a may be configured to receive search requests from other computing devices, such as the user computing device 102a (FIG. 1), and to use the search requests to generate one or more search terms. Term standardizer 242 may be configured to standardize the one or more search terms from search query evaluator 244a. Additionally, term standardizer 242 may also be configured to standardize one or more terms in paragraph terms 238a. Paragraph score generator 244b may be configured to match the search terms from search query evaluator 244a or the standardized search terms from term standardizer 242 to one or more terms within paragraph terms 238a. In some embodiments, paragraph score generator 244b may also be configured to limit the number of paragraphs terms or paragraphs that are analyzed during this matching. Paragraph score generator 244b may also be configured to retrieve one or more term weights from term weights 238b that are associated with the matching paragraph terms and use the retrieved term weights to generate one or more paragraph scores.

As described in more detail below, search result generator 244c may be configured to receive the paragraph scores generated by paragraph score generator 244b and use the paragraph scores to generate overall document scores for electronic documents 238c. Search result generator 244c may also use the overall document scores to determine a set of matching documents in electronic documents 238c. In some embodiments, search result generator 244c may limit the set of matching documents to a maximum number of documents. Search result generator 244c may also be configured to provide the set of matching documents to other computing devices (e.g., user computing device 102a, administrator computing device 102c, etc.) and/or to an electronic display.

It should also be understood that the components illustrated in FIG. 2 are merely exemplary and are not intended to limit the scope of this disclosure. While the components of memory 240 and data storage 236 are illustrated as separate components, one or more components may perform the functions of another component. For example, the functions of paragraph score generator 244b may alternatively be performed by search result generator 244c.

Additionally, while the components in FIG. 2 are illustrated as residing within the paragraph-based search engine 102b, this is merely an example. In some embodiments, one or more of the components may reside external to the paragraph-based search engine 102b. For example, electronic documents 238c may be stored on a separate computing device and accessed by paragraph-based search engine 102b over a network. Similarly, while FIG. 2 is directed to the paragraph-based search engine 102b, other components, such as the user computing device 102a and the administrator computing device 102c, may include similar hardware, software, and/or firmware.

Figure 3A:
FIG. 3A depicts a flowchart illustration of a process for that may be utilized for implementing paragraph-based searching, according to one or more embodiments shown and described herein.

FIG. 3A depicts a flowchart illustration of a process for performing paragraph-based searching, according to one or more embodiments. In some embodiments, paragraph-based search engine 102b utilizes one or more parts of the process to perform paragraph-based searching. The process includes comparing search terms to paragraph terms (block 301). For example, paragraph-based search engine 102b may receive a search request and use search query evaluator 244a to parse the search request for one or more search terms.

The process also includes generating paragraph scores (block 303). For example, paragraph scores are generated using term weight values of the paragraph terms that match the search terms. Generally, term weights 238b provide a relative measure of the importance of a term appearing within a particular paragraph. For example, a term that is infrequently used in the English language that appears multiple times within a given paragraph may be given a high term weight, in some embodiments. Paragraph score generator 244b may use the terms weights of the matching terms to generate paragraph scores for one or more of the paragraphs of electronic documents 238c.

The process further includes generating overall document scores (block 305). In some embodiments, the generated paragraph scores may be used to generate overall document scores. For example, search result generator 244c may use the paragraph scores determined by paragraph score generator 244b to generate overall document scores. A set of matching documents may also be determined (block 307) using, in some embodiments, overall document scores. For example, search result generator 244c may compile a set of search results (e.g., matching documents) using the overall document scores. The set of matching documents may also be provided for display (block 309). For example, paragraph-based search engine 102b may provide the search results to a local display via I/O hardware 232 or the display of a remote computer (user computing device 102a, administrator computing device 102c, etc.) via network 100.

Referring again to FIG. 2, paragraph terms 238a may be provided to paragraph-based search engine 102b as a predetermined set of paragraph terms or may be generated by paragraph-based search engine 102b using one or more local or remote services, according to various embodiments. For example, predetermined paragraph terms may be provided to paragraph-based search engine 102b by an indexing server or as a flat file that is uploaded by a user. In another embodiment, search engine 102b may generate paragraph terms 238a locally. For example, search query evaluator 244a may also be configured to parse electronic documents 238c and generate sets of terms for the paragraphs in electronic documents 238c. Similarly, term standardizer 242 may standardize the parsed terms to store paragraph terms 238a as sets of standardized paragraph terms, in some embodiments. For example, the terms "house," "abode," and "domicile" may be standardized by term standardizer 242 as the term "home," for purposes of searching. As an example and not a limitation, suitable term standardization techniques are disclosed in U.S. patent application Ser. No. 12/869,400 filed Aug. 26, 2010, which is hereby incorporated by reference. Paragraph terms 238a may also include sets of paragraph terms for each paragraph in electronic documents 238c or only a subset of paragraphs found in electronic documents 238c. For example, academic publications (e.g., law review articles, treatises, etc.) in electronic documents 238c may contain bibliographic sections devoted to references cited in the publications that may be ignored during a paragraph-based search, in some embodiments. In such a case, paragraph terms 238a may not contain sets of paragraph terms for these sections. In addition to being associated with a particular document (e.g., a legal case, an article, etc.), paragraph terms 238a may also be associated with one or more collections that contain the document (e.g., all U.S. Supreme Court cases, all patent cases, etc.), according to one or more embodiments.

Where electronic documents 238c include one or more electronic legal documents, paragraph terms 238a may include legal terms found within such document and/or standardizations of such terms. Legal terms may be, but are not limited to, words or phrases that associated with laws and statutes (e.g., "Patriot Act," "Fourteenth Amendment," etc.), legal theories (e.g., "res judicata," "res ipsa loquiter," etc.), case names (e.g., "*Roe* v. *Wade*," "*Bush* v. *Gore*," etc.), or words commonly used in the legal field (e.g., "negligence," "fault," "injury," etc.).

Generally, term weights 238b provide a measure of the importance of an associated paragraph term within a particular paragraph. Terms weights 238b may also be provided to paragraph-based search engine 102b as a predetermined set of term weights or may be generated by one or more local services. For example, an indexing server or a user providing paragraph terms 238a to paragraph-based search engine 102b may also provide the associated term weights 238b. In another embodiment, search engine 102b may generate term weights 238b locally. For example, paragraph score generator 244b may also be configured to generate term weights 238b. Term weights 238 may be generated using any known term weighting technique. For example, a term-frequency inverse document frequency (TF-IDF) term weight may be calculated for paragraph terms 238a. However, any known technique for generating term weights may be used (e.g., using relative term frequencies across all of electronic documents 238c, a collection within electronic documents 238c, among the paragraphs of a particular document, etc.).

Figure 3B:
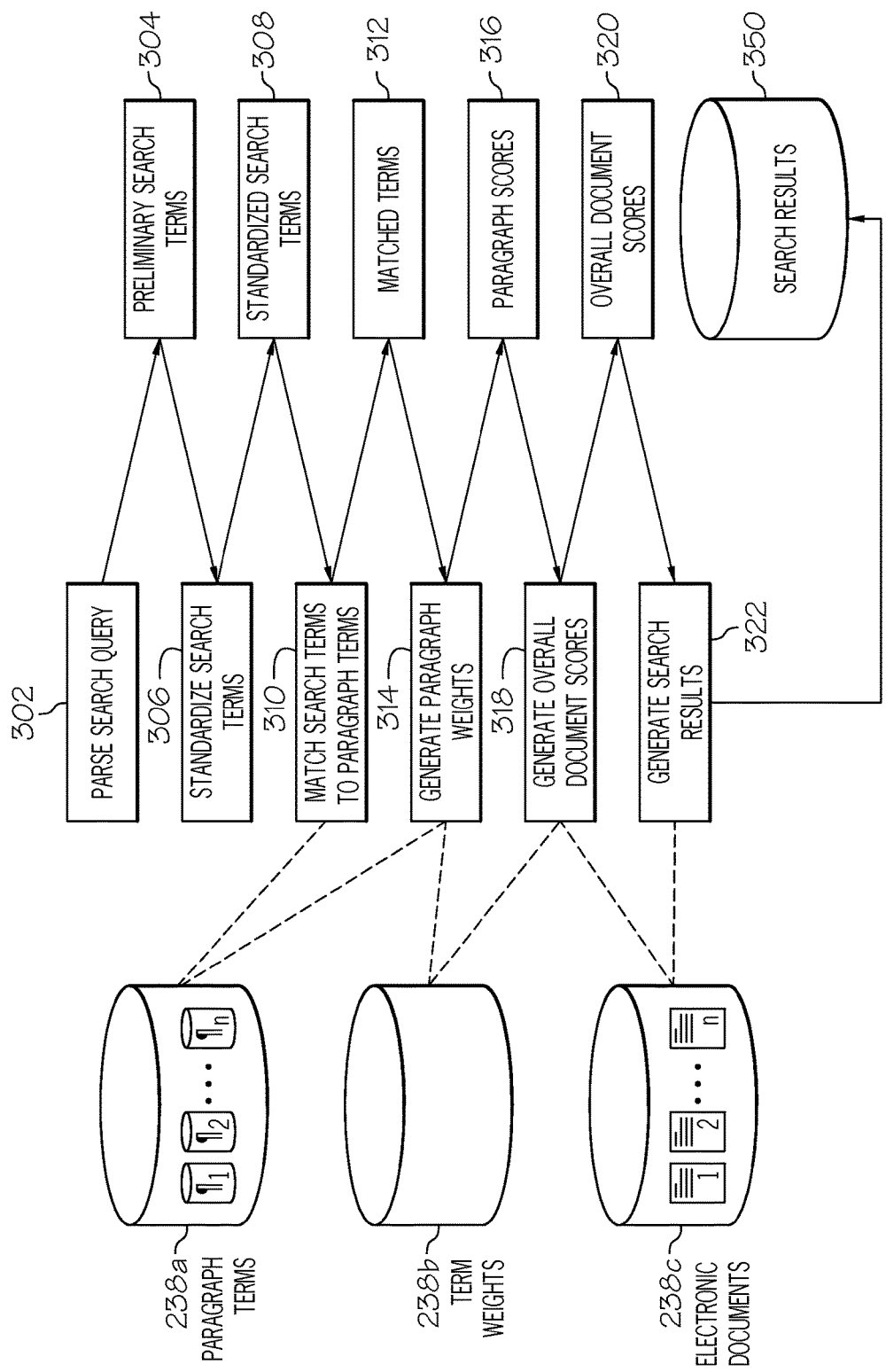
FIG. 3B depicts a flowchart illustration of a process that may be utilized for implementing paragraph-based searching using term standardization, according to one or more embodiments shown and described herein.

FIG. 3B depicts a flowchart illustrating a process that may be utilized for implementing paragraph-based document searching using term standardization, according to embodiments shown and described herein. Paragraph-based search engine 102b may store paragraph terms 238a, terms weights 238b, and electronic documents 238c in data storage 236. For example, data storage 236 may include the following information, in one embodiment:

TABLE 1

| Document No. | Paragraph No. | Paragraph Term | Term Weight |
|---|---|---|---|
| 19 | 5 | Second Amendment | .4123 |
| 19 | 5 | Heller Decision | .2259 |
| 19 | 5 | Freedom | .1145 |
| ... | ... | ... | ... |

As illustrated in Table 1, paragraph terms 238a and their associated term weights 238b are shown for the fifth paragraph of document number nineteen in electronic documents 238c. In some embodiments, some or all of paragraph terms 238a may be standardized paragraph terms. For example, the fifth paragraph of document number nineteen may contain the words "liberty" and "independence," (which may be standardized as "freedom" in paragraph terms 238a, as described below). Similarly, TF-IDF term weights are associated with paragraph terms 238a to denote their frequency of use within the given paragraph relative to their usage throughout the document. For example, the high term weight associated with the "Second Amendment" paragraph term may indicate that the paragraph contains a high usage of the term, in comparison to the rest of the document or to the entire collection of electronic documents 238c.

Search query evaluator 244a may parse a search query (block 302) and generate a set of preliminary search terms (block 304). In some embodiments, term standardizer 242 may also standardize the search terms (block 306) to generate a set of standardized search terms (block 308). For example, term standardizer 242 may utilize the term normalization techniques disclosed in U.S. patent application Ser. No. 12/869,400 and/or other standardization techniques to standardize the search terms. Term standardization techniques may include, but are not limited to, term stemming and techniques that use synonym rings. Generally, term stemming techniques reduce terms to their root form. For example, the terms "abandoning," and "abandoned" may be reduced to their root term, "abandon." Techniques that utilize synonym rings, however, replace terms having the same or semantically similar meanings with a single, standardized term. For example, the terms "children," "minor," and "minors," may be replaced by the single term, "child." Term standardizer 242 may also use a combination of techniques, according to some embodiments. For example, the terms "abandoning a child," "abandonment of the minors," and "abandon the minor," may be standardized using term stemming and synonym rings as "child abandonment." While term standardization may be omitted in some embodiments, standardizing search terms and/or paragraph terms increases the accuracy and reliability of the search results generated by search engine 102b.

Paragraph score generator 244b matches the search terms to one or more terms stored in paragraph terms 238a (block 310) to generate one or more sets of matched paragraph terms (block 312). In one embodiment, both the search terms and paragraph terms 238a are standardized by term standardizer 242 prior to paragraph score generator 244b matching the search terms to the paragraph terms. Standardization of both the search terms and paragraph terms 238a may provide a high degree of accuracy for the search by simplifying the set of terms to be matched. However, it is also contemplated in other embodiments that no standardization, or only a partial standardization, of search terms and paragraph terms 238a is performed by term standardizer 242. For example, term standardizer 242 may only standardize terms of legal significance (e.g., "free speech," "First Amendment," etc.) and ignore other terms. In addition, it is also contemplated that paragraph score generator 244b limits the number of paragraphs that are assigned a paragraph score.

Paragraph score generator 244b also uses the term weights 238a associated with the matched terms to generate paragraph scores (block 314), and stores the paragraph scores (block 316) in memory 240. Paragraph score generator 244b may utilize any combination of terms weights for the matching terms to generate the paragraph scores. For example, in one embodiment, the paragraph scores may be calculated as:

$$W_n = \Sigma |\text{occurrences}_{i,j}| * \text{weight}_i$$

where $W_n$ is the paragraph score, $\text{occurrences}_{i,j}$ is the number of occurrences of the ith search term in the jth paragraph, and $\text{weight}_i$ is the associated paragraph term weight of the ith term. In other embodiments, the paragraph scores are computed using a limit on the number of times a matching search term can be counted for a paragraph (e.g., by using a maximum value for $\text{occurrences}_{i,j}$). Such a limit may be used to favor paragraphs having different terms that match the search terms instead of paragraphs having only a few matching terms that occur many times.

Search result generator 244c uses the paragraph scores generated by paragraph score generator 244b to generate overall document scores (block 318), which are stored in memory 240 as overall document scores (block 320). Any number of weighing techniques may be used to determine the overall document scores. As an example and not a limitation, the overall document scores may be computed using the following equation:

$$W_d = \sum_{n=1}^{k} (W_n)^P,$$

where $W_d$ is the overall document score, k is the number of paragraphs in the document, $W_n$ is the paragraph score of the nth paragraph in the document, and P is a number in a range of 2.0 to 3.0. The parameter, P, may be used to enhance the weights of those paragraphs that have many terms matches. For example, setting P to be 2.5 has been empirically shown to enhance the weights of paragraphs having many term matches, while still allowing other paragraphs to have a non-trivial effect on the overall document weight. In other embodiments, the overall document weight may be generated by search result generator 244c without providing any extra weighting to the paragraph scores (e.g., P is equal to 1).

In some embodiments, a limit on the number of best paragraphs may also be used, e.g., an overall document score is generated only for those documents determined to have the highest paragraph scores.

Search result generator 244c then utilizes the overall document scores (block 320) to generate the search results (block 322), and to store the search results (block 350). More specifically, search results (block 350) may be one or more documents in electronic documents 238c or other reference data associated with electronic documents 238c (e.g., a hyperlink, a document name, a document title, etc.). In one embodiment, search result generator 244c uses overall document scores (block 320) to sort the search results. For example, search result generator 244c may order the search results in ascending or descending order, according to their overall document scores. In another embodiment, search result generator 244c may limit the set of matching documents used to generate the search results to a maximum number of documents. The size limit for the search results may be either automatically determined by search result generator 244c (e.g., to conform the results to a given screen size, a specific memory size requirement, etc.) or in response to a parameter received from user computing device 102a (e.g., a user has specified a limit on the number of results).

As described above, the methods described herein may be implemented as one or more software programs comprising computer executable code residing in a computer. The processor of a computer device such as a personal computer may execute the computer executable code to perform the computer-implemented annotation methods described herein above. Collaborators may access the computer executable code locally on respective computer devices or remotely such as in a cloud computing system to share annotation information between various documents.

It should now be understood that the embodiments described herein may be used for paragraph-based searching collections of electronic documents. One or more sets of paragraph terms and term weights may be associated with the documents and used to enhance research and searching. The paragraph terms and term weights allow paragraph scores to be generated for terms that match parts of a search query. The paragraph scores may, in turn, be used to generate overall document scores, allowing search results to be determined that correspond to those documents having the highest degree of relevance to the search query at the paragraph level. In some embodiments, term standardization may also be performed on the paragraph terms and/or the search terms to retrieve documents that have related or semantically similar terms and ideas as the search query.

While particular embodiments have been illustrated and described herein, it should be understood that various other changes and modifications may be made without departing from the spirit and scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of searching a collection of electronic documents, the method comprising:
   replacing a set of synonymous terms appearing in a paragraph with a set of standardized paragraph terms, wherein each standardized paragraph term has an associated term weight;
   generating standardized search terms in response to a search query;

generating paragraph scores for paragraphs of a document based at least in part on the associated weights of standardized paragraph terms that match one or more of the standardized search terms;

determining overall document scores for the electronic documents based at least in part on a combination of the paragraph scores; and determining a set of matching documents, wherein the set of matching documents is ordered using the overall document scores.

2. The method of claim 1, further comprising:

generating sets of paragraph terms for the paragraphs of the electronic documents;

standardizing the sets of paragraph terms to generate sets of standardized paragraph terms for the paragraphs; and associating a term weight with each standardized paragraph term.

3. The method of claim 2, wherein the term weights are based on inverse frequency scores.

4. The method of claim 1, wherein the paragraph scores are generated using a limit on the number of times a matching search term can be counted for a paragraph.

5. The method of claim 1, wherein the overall document score is determined using the formula:

$$W_d = \sum_{n=1}^{k} (W_n)^P,$$

where Wd is the overall document score, k is the number of paragraphs in a document, Wn is the paragraph score of the nth paragraph in the document, and P is a value.

6. The method of claim 5, wherein the value of P is within a range of 2.0 to 3.0.

7. The method of claim 1, further comprising:

retrieving a text of a matching document in response to receiving a selection of the matching document; and providing the text to a display device.

8. The method of claim 1, wherein the standardized paragraph terms comprise legal terms.

9. A method of searching a collection of electronic documents comprising:

replacing a set of synonymous terms within a paragraph with a set of standardized paragraph terms for paragraphs in electronic documents of a collection;

associating term weight values with paragraph terms in the sets of standardized paragraph terms, wherein each term weight value is associated with an individual paragraph term;

generating a set of search terms in response to receipt of a search query, wherein the search terms are based at least in part on a query string of the search query;

replacing the search query with the set of standardized paragraph terms;

comparing the set of search terms with the sets of paragraph terms;

generating a paragraph score for the paragraphs using the term weight values of the standardized paragraph terms that match one or more of the search terms, wherein each paragraph score is associated with an individual paragraph;

generating an overall document score for the electronic documents by combining the paragraph scores of the paragraphs in the electronic documents, wherein each overall document score is associated with an individual electronic document;

determining, by a processor, a set of matching documents from the electronic documents associated with the collection based at least in part on the generated overall document scores, wherein the electronic documents within the set of matching documents are sorted by overall document score; and providing the set of matching documents for display.

10. The method of claim 9, wherein the term weight values are generated using inverse frequency scores.

11. The method of claim 9, wherein the paragraph scores are generated by limiting the number of times a paragraph term can be counted to generate a paragraph score.

12. The method of claim 9, wherein the overall document weights are computed by:

$$W_d = \sum_{n=1}^{k} (W_n)^P,$$

where Wd is the overall document score, k is the number of paragraphs in the document, Wn is the paragraph score of the nth paragraph in a document, and P is a value.

13. The method of claim 12, wherein the value of P is in a range of 2.0 to 3.0.

14. The method of claim 9, wherein the paragraph scores are generated for less than, or equal to, a maximum number of paragraphs.

15. The method of claim 9, wherein a number of paragraph scores that is used to generate an overall document score is less than the number of paragraphs in a document.

* * * * *